United States Patent
Wang

(10) Patent No.: US 9,395,263 B2
(45) Date of Patent: Jul. 19, 2016

(54) METHOD FOR INSPECTING SEALABILITY OF VACUUM CHAMBER

(71) Applicant: Shenzhen China Star Optoelectronics Technology Co., Ltd., Shenzhen, Guangdong (CN)

(72) Inventor: Zhiwu Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 77 days.

(21) Appl. No.: 14/411,393

(22) PCT Filed: Oct. 10, 2014

(86) PCT No.: PCT/CN2014/088310
§ 371 (c)(1),
(2) Date: Dec. 25, 2014

(87) PCT Pub. No.: WO2016/045150
PCT Pub. Date: Mar. 31, 2016

(65) Prior Publication Data
US 2016/0103036 A1 Apr. 14, 2016

(30) Foreign Application Priority Data
Sep. 28, 2014 (CN) .......................... 2014 1 0510010

(51) Int. Cl.
*G01M 3/34* (2006.01)
*G01M 3/22* (2006.01)
*G01M 3/32* (2006.01)

(52) U.S. Cl.
CPC ................ *G01M 3/34* (2013.01); *G01M 3/226* (2013.01); *G01M 3/3272* (2013.01)

(58) Field of Classification Search
CPC ... G01M 3/34; G01M 3/3263; G01M 3/3272; G01M 3/266
See application file for complete search history.

(56) References Cited

U.S. PATENT DOCUMENTS 6,223,587 B1* 5/2001 Chiocca .................... G21F 5/12
250/506.1
2013/0255360 A1* 10/2013 Minami ............... C25D 17/004
73/40.5 R

OTHER PUBLICATIONS

IrrigationTutorials.com, "How to Repair a Irrigation Solenoid Valve", http://www.irrigationtutorials.com/faq/repair-valve.htm.*

\* cited by examiner

*Primary Examiner* — Paul West
(74) *Attorney, Agent, or Firm* — Andrew C. Cheng

(57) ABSTRACT

The present invention discloses a method for inspecting sealability of a vacuum chamber. The vacuum chamber has a closed site in which two sealing rings are arranged in such a way that the two sealing rings form therebetween a sealed compartment. The sealed compartment has a wall in which an evacuation hole is formed. The method for inspecting sealability of a vacuum chamber includes: connecting an evacuation valve through a pipe to the evacuation hole to form evacuation piping; mounting a pressure meter to the evacuation piping; opening the evacuation valve to proceed with evacuation of the sealed compartment and, during the evacuation process, monitoring the pressure meter; and determining sealability of the two sealing rings according to a reading of the pressure meter. The present invention allows for quick evacuation of the sealed compartment and to determine the sealability of the two sealing rings according to the pressure meter.

11 Claims, 2 Drawing Sheets

METHOD FOR INSPECTING SEALABILITY OF VACUUM CHAMBER

CROSS REFERENCE TO RELATED APPLICATIONS

This application claims the priority of Chinese Patent Application No. 201410510010.X filed on Sep. 28, 2014,, the disclosure of which is incorporated herein by reference in its entirety.

BACKGROUND OF THE INVENTION

1. Field of the Invention

The present invention relates to a method for inspecting sealability of a closed site of a vacuum chamber.

2. The Related Arts

A closed site of a vacuum chamber is often sealed with an O-ring. In the known art, a sealing structure comprises two O-rings to achieve sealing. A wall between the two O-rings comprises a hole formed therein for connection with an evacuation pump, which is operable to evacuate air from a space between the two O-rings so as to achieve vacuum between the two O-rings through evacuation. Such a structure, although helping improve sealing reliability, suffers certain problems, which generally exhibit in the following aspects:

(1) It is difficult to open the chamber of the vacuum-receiving object. Since the space between the two O-rings is in a vacuum condition, to separate the chamber, the force induced by the atmosphere must be overcome. It is even more difficult for vacuum chambers of large sizes.

(2) It is generally hard to ensure both O-rings provide perfect sealing. When one of the two O-rings exhibits defect of sealing and consequently leaks, although the sealability of the chamber is not affected, the purpose of arranging two O-rings fails and the reliability of sealing deteriorates.

Thus, it has long been an issue of the industry to provide a method for inspecting the sealability of a closed site of a vacuum chamber so as to achieve quick chamber opening and easy chamber opening and to efficiently determine the sealability of an O-ring arranged at a closed site of a vacuum chamber.

SUMMARY OF THE INVENTION

The technical issue to be addressed by the present invention is to provide a method for inspecting sealability of a vacuum chamber, which allows for precise alignment between an array substrate and a color film substrate in a bonding process to as to prevent poor alignment of the substrates resulting from conveying or turning.

To achieve the above object, the present invention provides a technical solution as follows.

The present invention provides a method for inspecting sealability of a vacuum chamber, wherein the vacuum chamber has a closed site in which two sealing rings are arranged in such a way that the two sealing rings form therebetween a sealed compartment, the sealed compartment having a wall in which an evacuation hole is formed. The method for inspecting sealability of a vacuum chamber comprises: connecting an evacuation valve through a pipe to the evacuation hole to form evacuation piping; mounting a pressure meter to the evacuation piping; opening the evacuation valve to proceed with evacuation of the sealed compartment and, during the evacuation process, monitoring the pressure meter; and determining sealability of the two sealing rings according to a reading of the pressure meter.

Wherein, a process for determining sealability of the two sealing rings according to the reading of the pressure meter comprises: determining the two sealing rings are leaking if the reading of the pressure meter does not reach a first predetermined level, where the first predetermined level is a pressure level of the sealed compartment in a vacuum condition; otherwise determining the two sealing rings are in a sealed condition without leakage if the reading of the pressure meter reaches the first predetermined level.

Wherein, when it is determined that the two sealing rings are leaking, the chamber is opened and the two sealing rings and the vacuum chamber that is used in combination with the two sealing rings are cleaned, and then, the vacuum chamber is closed to allow the process of evacuation of the sealed compartment with the evacuation valve to proceed again.

Wherein, when it is determined that the two sealing rings are without leakage, an interior space of the vacuum chamber is evacuated.

Wherein, when it is determined the two sealing rings are leaking, the method for inspecting sealability of the vacuum chamber further comprises: mounting a helium leakage detection device to the evacuation piping, where the helium leakage detection device determines if helium exists in the sealed compartment during the evacuation process; spraying helium gas to the closed site of the vacuum chamber with a gas nozzle arranged outside the vacuum chamber; identifying an outer sealing ring of the sealing rings is leaking if the helium leakage detection device detects helium; and identifying the outer sealing ring of the two sealing rings is not leaking and an inner sealing ring of the two sealing rings is leaking if the helium leakage detection device detects no helium.

Wherein, the wall of the sealed compartment comprises an inlet hole formed therein, the method for inspecting sealability of the vacuum chamber further comprises: connecting an inlet valve, through a pipe, to the inlet hole to form inlet piping; in evacuating the sealed compartment, closing the inlet valve and then opening the evacuation valve; and in opening the vacuum chamber, closing the evacuation valve and then opening the inlet valve to allow outside air to flow through the inlet piping into the sealed compartment to raise the pressure inside the sealed compartment to the level of the atmospheric pressure.

Wherein, an air pressure meter is mounted to the inlet piping and determination as to whether to open the vacuum chamber is made according to if reading of the air pressure meter is close to atmospheric pressure.

Wherein, an air pressure meter is mounted to the inlet piping and determination is made as to whether reading of the air pressure meter reaches a second predetermined level that is atmospheric pressure or a level close to the atmospheric pressure, whereby when the reading of the air pressure meter reaches the second predetermined level, the vacuum chamber is opened.

Wherein, an alarm device is mounted to the inlet piping so that when the reading of the air pressure meter reaches the second predetermined level, the alarm device issues an alarm to remind an operator to open the vacuum chamber.

The present invention provides an arrangement that an evacuation hole is externally connected with evacuation piping and an evacuation valve is operated to proceed with evacuation, whereby the reading of a pressure meter determines if a sealed compartment is in a vacuum condition so as to determine the sealability of an arrangement of two sealing rings. Since the sealed compartment between the two sealing rings takes only a relatively small amount of a space of an entire vacuum chamber, air can be quickly evacuated from the sealed compartment to achieve vacuum and the sealability of the two sealing rings can be efficiently determined according to the reading of the pressure gauge so that frequent opening/closing of the chamber can be avoided and thus time can be saved for a manufacturing process.

BRIEF DESCRIPTION OF THE DRAWINGS

To more clearly explain the technical solution proposed in the present invention, a brief description of the drawings that are necessary for embodiments is given as follows. It is obvious that the drawings that will be described below show only some embodiments. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of an embodiment of the present invention with reference to the attached drawings of the embodiment of the present invention.

Figure 1:
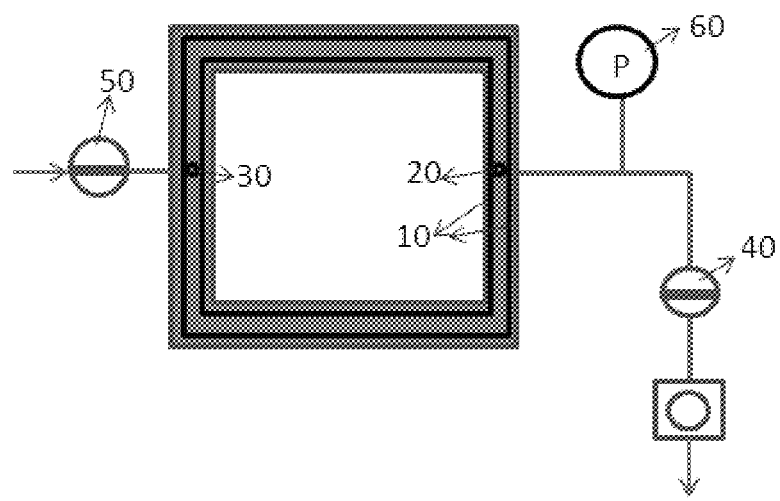
FIG. 1 is a schematic view illustrating opening a vacuum chamber according to an embodiment of a method for inspecting sealability of a vacuum chamber according to the present invention.
Figure 2:
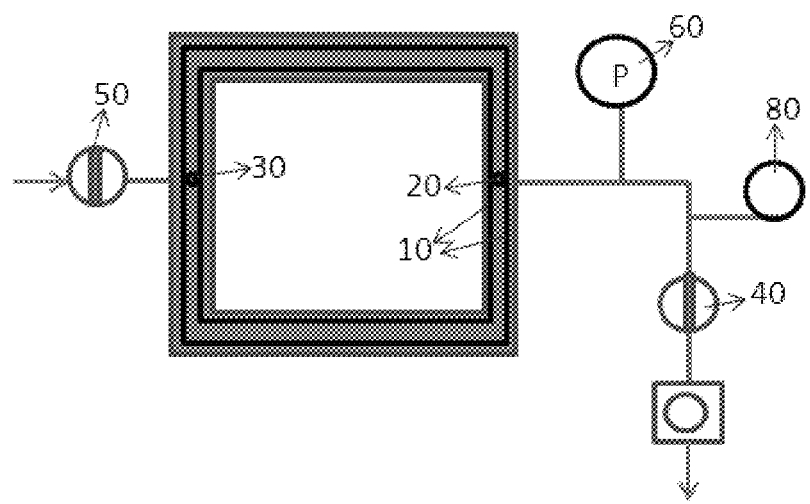
FIG. 2 is a schematic view illustrating evacuating a vacuum chamber according to an embodiment of a method for inspecting sealability of a vacuum chamber according to the present invention.

The present invention provides a method for inspecting sealability of a vacuum chamber. With reference to FIGS. 1 and 2, a vacuum chamber has a closed site, in which two sealing rings 10 are arranged in such a way that the two sealing rings 10 form therebetween a sealed compartment. The sealed compartment has a wall in which an evacuation hole 20 is formed. The method for inspecting sealability of the vacuum chamber comprises: connecting an evacuation valve 40 through a pipe to the evacuation hole 20 to form evacuation piping; mounting a pressure meter 60 to the evacuation piping; opening the evacuation valve 40 to proceed with evacuation of the sealed compartment and, during the evacuation process, monitoring the pressure meter 60; and determining sealability of the two sealing rings 10 according to a reading of the pressure meter 60.

The present invention provides an arrangement that the evacuation hole 20 is externally connected with the evacuation piping and the evacuation valve 40 is operated to proceed with evacuation, whereby the reading of the pressure meter 60 determines if a sealed compartment is in a vacuum condition so as to determine the sealability of the two sealing rings 10. Since the sealed compartment between the two sealing rings 10 takes only a relatively small amount of space of the entire vacuum chamber, air can be quickly evacuated from the sealed compartment to achieve vacuum and the sealability of the two sealing rings 10 can be efficiently determined according to the reading of the pressure gauge so that frequent opening/closing of the chamber can be avoided and thus time can be saved for a manufacturing process.

In an embodiment, a process for determining sealability of the two sealing rings 10 according to a reading of the pressure meter 60 comprises: determining the two sealing rings 10 are leaking if the reading of the pressure meter 60 does not reach a first predetermined level, where the first predetermined level is a pressure level of the sealed compartment in a vacuum condition; otherwise determining the two sealing rings 10 are in a sealed condition without leakage if the reading of the pressure meter 60 reaches the first predetermined level. In the instant embodiment, the first predetermined level is 0.1 Pa. In case of leakage of the two sealing rings 10, the pressure level inside the sealed compartment would exceed the first predetermined level. For example, during the process of evacuation, the reading of the pressure gauge can be lowered to the best to 0.5 Pa, which is greater than the first predetermined level, 0.1 Pa, and this evidences there is leakage of the two sealing rings 10.

Further, in case of leakage of the two sealing rings 10, one possible cause of leakage might be contamination on a surface of the two sealing rings 10 and cleaning is necessary. For this case, the chamber must be opened to have the two sealing rings 10 and the vacuum chamber that is used in combination with the two sealing rings 10, and then, the vacuum chamber is closed to allow the process of evacuation of the sealed compartment with the evacuation valve 40 to proceed again.

To determine if there is no leakage of the two sealing rings 10, the interior of the vacuum chamber is evacuated.

In an embodiment of the present invention, helium based leakage detection is applied to specifically determine which one of the two sealing rings has poor sealability. A specific process is descried as follows.

In case that it is determined that the two sealing rings 10 are leaking, the method for inspecting sealability of the vacuum chamber may further comprise: mounting a helium leakage detection device 80 to the evacuation piping, where the helium leakage detection device 80 determines if helium exists in the sealed compartment during the evacuation process; spraying helium gas to a closed site of the vacuum chamber with a gas nozzle arranged outside the vacuum chamber; identifying the outer sealing ring of the sealing rings 10 is leaking if the helium leakage detection device 80 detects helium for the helium leakage detection device 80 issues an alarm when detecting helium; and identifying the outer sealing ring of the two sealing rings 10 is not leaking and the inner sealing ring of the two sealing rings 10 is leaking if the helium leakage detection device 80 detects no helium.

In the instant embodiment, an inlet hole 30 is provided in the wall of the sealed compartment and the method for inspecting sealability of the vacuum chamber further comprises the following steps:

connecting an inlet valve 50, through a pipe, to the inlet hole 30 to form inlet piping.

In the condition shown in FIG. 2, the inlet valve 50 of FIG. 1 is set to a closed condition and the evacuation valve 40 is in an opened condition. When it needs to evacuate the sealed compartment, the inlet valve 50 is closed and then the evacuation valve 40 is open so that the process of evacuation described above is applied to evacuate the sealed compartment.

In the condition shown in FIG. 1, the inlet valve 50 of FIG. 1 is set in an opened condition and the evacuation valve 40 is in a closed condition. When it is necessary to open the vacuum chamber, the evacuation valve 40 is closed and then the inlet valve 50 is opened to allow the outside air to flow through the inlet piping into the sealed compartment to raise the air pressure inside the sealed compartment to the level of the atmospheric pressure. When the air pressures inside the sealed compartment reaches atmospheric pressure, opening of the vacuum chamber can be easily carried out.

For easy determination of the gas pressure inside the sealed compartment being atmospheric pressure, an air pressure meter is mounted to the inlet piping so that it can be determined if the vacuum chamber can be opened according to the reading of the air pressure meter being close to atmospheric pressure. Specifically, a second predetermined level is set, where the second predetermined level is atmospheric pressure or a pressure close to atmospheric pressure, and the inlet valve 50 is opened to allow the outside air to gradually flow into the sealed compartment and the pressure reading gradually rises so that when the reading of the air pressure meter reaches the second predetermined level, the vacuum chamber can be opened.

In an embodiment of the present invention, an alarm device may be additionally mounted to the inlet piping so that when the reading of the air pressure meter reaches the second predetermined level, the alarm device issues an alarm to remind an operator to open the vacuum chamber. A buzzer may be used to issue an audio alarm or LED (Light-Emitting Diode) lights may be used to provide the reminder through lighting. For example, when the pressure inside the inlet piping does not reach the second predetermined level, a red LED lights; and when the pressure of the inlet piping reaches the second predetermined level, a green LED lights.

The present invention has been described with reference to the preferred embodiments. However, it is noted that those skilled in the art would appreciates that various improvements and modifications are still available without departing from the scope of the present invention and such improvements and modifications are considered within the scope of protection of the present invention.

What is claimed is:

1. A method for inspecting sealability of a vacuum chamber, wherein the vacuum chamber has a closed site in which two sealing rings are arranged in such a way that the two sealing rings form therebetween a sealed compartment, the sealed compartment having a wall in which an evacuation hole is formed, the method for inspecting sealability of a vacuum chamber comprising:
   connecting an evacuation valve through a pipe to the evacuation hole to form evacuation piping;
   mounting a pressure meter to the evacuation piping;
   opening the evacuation valve to proceed with evacuation of the sealed compartment and, during the evacuation process, monitoring the pressure meter; and
   determining sealability of the two sealing rings according to a reading of the pressure meter;
   wherein a process for determining sealability of the two sealing rings according to the reading of the pressure meter comprises: determining the two sealing rings are leaking if the reading of the pressure meter does not reach a first predetermined level, where the first predetermined level is a pressure level of the sealed compartment in a vacuum condition; otherwise determining the two sealing rings are in a sealed condition without leakage if the reading of the pressure meter reaches the first predetermined level; and
   wherein when it is determined the two sealing rings are leaking, the method for inspecting sealability of the vacuum chamber further comprises:
   mounting a helium leakage detection device to the evacuation piping, where the helium leakage detection device determines if helium exists in the sealed compartment during the evacuation process;
   spraying helium gas to the closed site of the vacuum chamber with a gas nozzle arranged outside the vacuum chamber;
   identifying an outer sealing ring of the sealing rings is leaking if the helium leakage detection device detects helium; and
   identifying the outer sealing ring of the two sealing rings is not leaking and an inner sealing ring of the two sealing rings is leaking if the helium leakage detection device detects no helium.

2. The method for inspecting sealability of the vacuum chamber as claimed in claim 1, wherein when it is determined that the two sealing rings are leaking, the chamber is opened and the two sealing rings and the vacuum chamber that is used in combination with the two sealing rings are cleaned, and then, the vacuum chamber is closed to allow the process of evacuation of the sealed compartment with the evacuation valve to proceed again.

3. The method for inspecting sealability of the vacuum chamber as claimed in claim 1, wherein when it is determined that the two sealing rings are without leakage, an interior space of the vacuum chamber is evacuated.

4. The method for inspecting sealability of the vacuum chamber as claimed in claim 1, wherein the wall of the sealed compartment comprises an inlet hole formed therein, the method for inspecting sealability of the vacuum chamber further comprises:
   connecting an inlet valve, through a pipe, to the inlet hole to form inlet piping;
   in evacuating the sealed compartment, closing the inlet valve and then opening the evacuation valve; and
   in opening the vacuum chamber, closing the evacuation valve and then opening the inlet valve to allow outside air to flow through the inlet piping into the sealed compartment to raise the pressure inside the sealed compartment to the level of the atmospheric pressure.

5. The method for inspecting sealability of the vacuum chamber as claimed in claim 4, wherein an air pressure meter is mounted to the inlet piping and determination as to whether to open the vacuum chamber is made according to if reading of the air pressure meter is close to atmospheric pressure.

6. The method for inspecting sealability of the vacuum chamber as claimed in claim 4, wherein an air pressure meter is mounted to the inlet piping and determination is made as to whether reading of the air pressure meter reaches a second predetermined level that is atmospheric pressure or a level close to the atmospheric pressure, whereby when the reading of the air pressure meter reaches the second predetermined level, the vacuum chamber is opened.

7. The method for inspecting sealability of the vacuum chamber as claimed in claim 6, wherein an alarm device is mounted to the inlet piping so that when the reading of the air pressure meter reaches the second predetermined level, the alarm device issues an alarm to remind an operator to open the vacuum chamber.

8. A method for inspecting sealability of a vacuum chamber, wherein the vacuum chamber has a closed site in which two sealing rings are arranged in such a way that the two sealing rings form therebetween a sealed compartment, the sealed compartment having a wall in which an evacuation hole is formed, the method for inspecting sealability of a vacuum chamber comprising:
   connecting an evacuation valve through a pipe to the evacuation hole to form evacuation piping;
   mounting a pressure meter to the evacuation piping;
   opening the evacuation valve to proceed with evacuation of the sealed compartment and, during the evacuation process, monitoring the pressure meter; and
   determining sealability of the two sealing rings according to a reading of the pressure meter;

wherein the wall of the sealed compartment comprises an inlet hole formed therein, the method for inspecting sealability of the vacuum chamber further comprises:

connecting an inlet valve, through a pipe, to the inlet hole to form inlet piping;

in evacuating the sealed compartment, closing the inlet valve and then opening the evacuation valve; and in opening the vacuum chamber, closing the evacuation valve and then opening the inlet valve to allow outside air to flow through the inlet piping into the sealed compartment to raise the pressure inside the sealed compartment to the level of the atmospheric pressure.

9. The method for inspecting sealability of the vacuum chamber as claimed in claim 8, wherein an air pressure meter is mounted to the inlet piping and determination as to whether to open the vacuum chamber is made according to if reading of the air pressure meter is close to atmospheric pressure.

10. The method for inspecting sealability of the vacuum chamber as claimed in claim 8, wherein an air pressure meter is mounted to the inlet piping and determination is made as to whether reading of the air pressure meter reaches a second predetermined level that is atmospheric pressure or a level close to the atmospheric pressure, whereby when the reading of the air pressure meter reaches the second predetermined level, the vacuum chamber is opened.

11. The method for inspecting sealability of the vacuum chamber as claimed in claim 10, wherein an alarm device is mounted to the inlet piping so that when the reading of the air pressure meter reaches the second predetermined level, the alarm device issues an alarm to remind an operator to open the vacuum chamber.

* * * * *